Jan. 24, 1967   W. R. BOHNER   3,299,439

DUST GUARD FOR SPECTACLES

Filed May 25, 1965

INVENTOR.
WILLIAM R. BOHNER
BY
*William J. Ruano*
his ATTORNEY 3,299,439
DUST GUARD FOR SPECTACLES
William R. Bohner, Reading, Pa., assignor to The Electric Storage Battery Company, Philadelphia, Pa.
Filed May 25, 1965, Ser. No. 458,678
2 Claims. (Cl. 2—13)

This invention relates generally to safety spectacles or protective goggles and, more particularly, to an attachment therefor for protection against entry of dust into the wearer's eyes.

In the past, goggles and safety spectacles with dust guards in the form of side shields and the like have been used but with the outstanding disadvantage of being cumbersome and expensive to manufacture and somewhat difficult to attach and yet not providing satisfactory protection against dust.

An object of my invention is to provide a novel dust guard attachment which is devoid of the abovenamed disadvantages and which may be easily and quickly mounted on a conventional pair of safety spectacles or goggles to provide protection of the eyes against dust resulting from industrial occupations.

Another object of my invention is to provide a plastic attachment which may be stamped out of a flat sheet of plastic material and thus made very inexpensively, and which is so constructed as to be easily and securely anchorable to the nose piece and to the temples of a pair of ordinary spectacles to prevent entry of dust from the top portion of the spectacles.

Other objects and advantages will become more apparent from a study of the following description taken with the accompanying drawing wherein.

Figure 1:
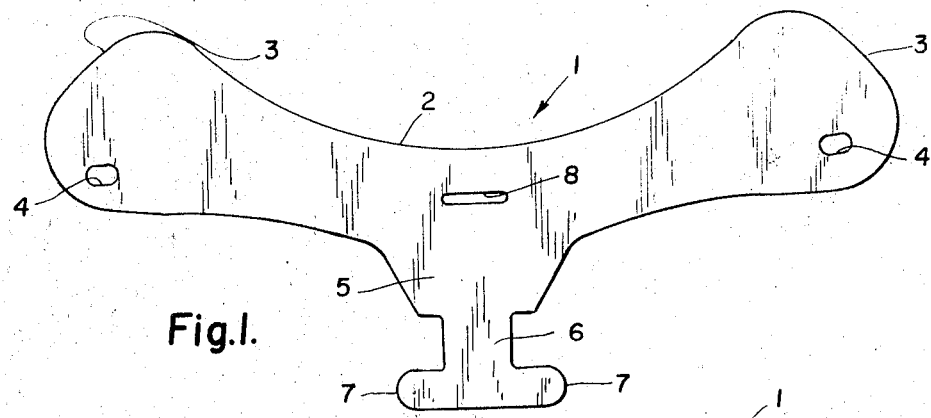
FIG. 1 is a top or plan view of the plastic attachment for safety spectacles or goggles and embodying the present invention.

Referring more particularly to FIG. 1 of the drawing, numeral 1 generally denotes a blank or flat piece of flexible material, preferably a plastic material, such as polyethylene, which is very flexible, as well as soft to the touch. The blank 1 is so shaped and cut-out so as to form a dust guard when the blank is wrapped about the top portion of a pair of spectacles, such as shown in FIGS. 2 to 5 inclusive. The blank has an arcuate portion 2 shaped to fit against the forehead of the wearer and terminating in curved side portions 3 adapted to cover portion of the sideshields 14 and having slots or holes 4 through which are inserted the temples 12 and side extensions 13 of the frame of the spectacles, as shown more clearly in FIGS. 2 and 3.

Figure 2:
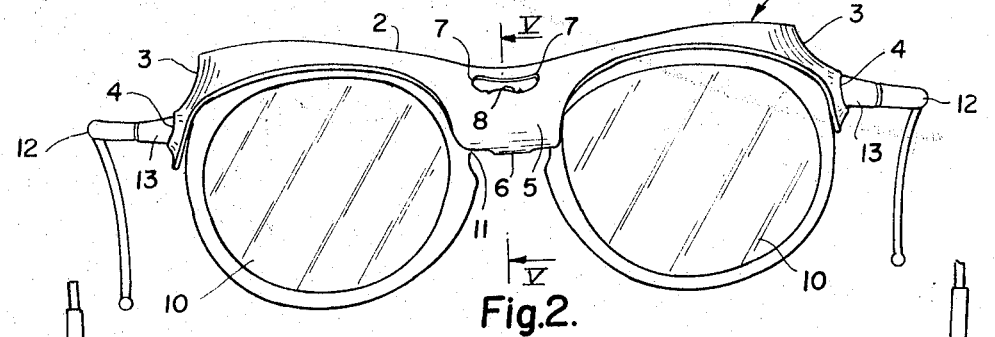
FIG. 2 is a front, elevational view of a pair of safety spectacles or goggles equipped with the dust guard attachment shown in FIG. 1.
Figure 3:
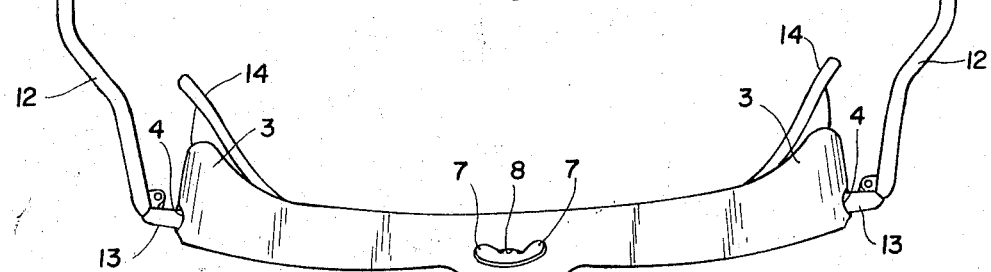
FIG. 3 is a top view of the assembly shown in FIG. 2.
Figure 4:
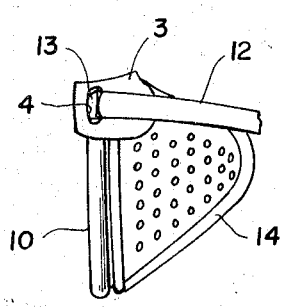
FIG. 4 is a side view of a fragmentary portion of the assembly shown in FIGS. 2 and 3.
Figure 5:
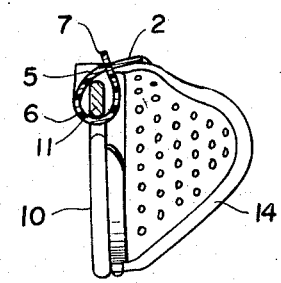
FIG. 5 is a cross-sectional view taken along line V—V of FIG. 2.

A central slot 8 is provided for receiving tabs 7, 7 when the tabs are flexed, as shown in FIGS. 2 and 3. A neck portion 6 is provided which wraps around the nose piece 11 of the spectacles. The spectacles may have either safety lenses 10 or ordinary lenses and are preferably provided with sideshields 14 having holes for ventilation.

In operation, therefore, when it is desired to mount the dust guard attachment 1 to the spectacles, the ends of the temples are inserted through holes 4 and the blank or attachment is moved forwardly to the top of the frame beyond extensions 13 whereupon tabs 7, 7 are grasped and portion 5 is wrapped around the nose piece and finally anchored in the wrapped position by folding and inserting tabs 7, 7 through the slot 8 and then allowing the tabs 7, 7 to unfold as shown in FIG. 2. Thus protection is afforded against the entry of dust from the top portion of the spectacles.

Dust is prevented from entering the side portions of the spectacles by means of sideshields 14 which may be of detachable type or may be pivotally mounted permanently to the top and bottom portions of the frame of the spectacles, in a well known manner.

Thus it will be seen that I have provided a dust guard attachment in the form of a very inexpensive, flat piece of flexible material, such as plastic material, which is so shaped that it can be slid along the temples and wrapped around the nose piece in a matter of seconds, to afford reliable protection against the entry of dust into the top portion of the spectacles, and which complements and overlaps the sideshields of safety spectacles so as to give complete all-around protection against dust without undue fogging.

While I have illustrated and described a single specific embodiment of my invention, it will be understood that this is by way of illustration only, and that various changes and modifications may be made within the contemplation of my invention and within the scope of the following claims.

I claim:
1. In combination with a pair of spectacles having a nosepiece, frame and temple, a dust guard for the top portion thereof, comprising a strip of flexible material having two holes at the sides thereof through which the temples of the spectacles are inserted, and having a central slot and a lateral extension from the central portion thereof terminating in tab means, said lateral extension being wrapped around the nosepiece and said tab means extending through said slot to form a closed loop.

2. In combination with a pair of safety spectacles having a frame with side extensions, temples pivotally mounted on said side extensions, and sideshields secured to said frame; a dust shield comprising a flexible strip of plastic material having sideholes through which said side extensions are inserted, said strip having a central arcuate portion shaped to fit against the forehead of the wearer, and having a central slot and a central lateral extension terminating in tab means, said central lateral extension being wrapped around said nosepiece with said tab means extending through said central slot to maintain said extension in the form of a loop tightly wrapped about said nosepiece, said strip having curved end portions fitted against said sideshields.

References Cited by the Examiner
UNITED STATES PATENTS

| | | | |
|---|---|---|---|
| 2,106,615 | 1/1938 | Maurer | 2—12 |
| 2,580,744 | 1/1952 | Edsall | 2—13 |
| 2,708,269 | 5/1955 | Von Gunten | 2—13 |
| 2,795,793 | 6/1957 | Sommers | 2—13 |
| 3,007,173 | 11/1961 | Gongoll | 2—14.1 |
| 3,237,204 | 3/1966 | Honsaker | 2—13 |

JORDAN FRANKLIN, *Primary Examiner.*
J. R. BOLER, *Assistant Examiner.*